No. 861,371. PATENTED JULY 30, 1907.
C. A. LATHAM.
AXLE BOX FOR VEHICLES.
APPLICATION FILED SEPT. 28, 1905.

WITNESSES:

INVENTOR.

UNITED STATES PATENT OFFICE.

CHESTER A. LATHAM, OF WICHITA, KANSAS.

AXLE-BOX FOR VEHICLES.

No. 861,371.  Specification of Letters Patent.  Patented July 30, 1907.

Application filed September 28, 1905. Serial No. 280,560.

*To all whom it may concern:*

Be it known that I, CHESTER A. LATHAM, a citizen of the United States, residing at Wichita, in the county of Sedgwick and State of Kansas, have invented certain new and useful Improvements in Axle-Boxes for Vehicles, of which the following is a specification, reference being had therein to the accompanying drawing and the figures of reference thereon, forming a part of the specification, in which—

Figure 2:
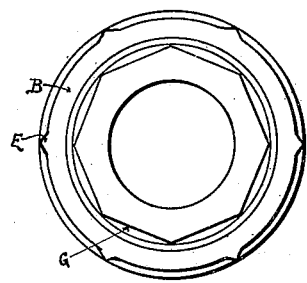
Figure 1:
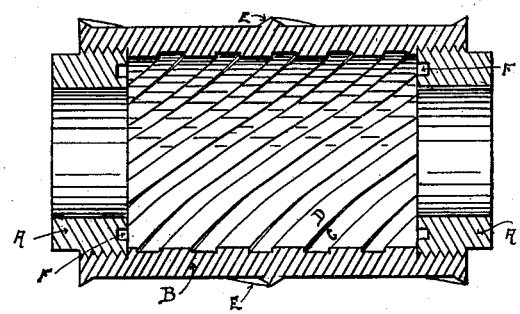
Figure 3:
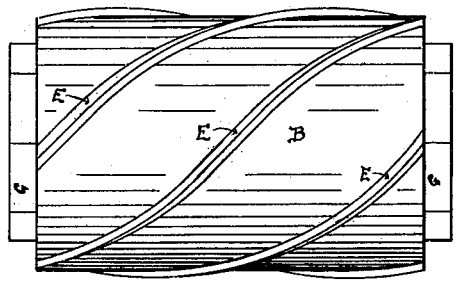

Figure 1 is a longitudinal section of the box showing the interior of the box, with its helical grooves and ridges, also collars, each of which is formed with a nut on one end and has a groove on the other. Fig. 2 is an end view of the box, showing also the outside of the collar and octagonal nut on the collar. Fig. 3 is a side view of the box, showing the exterior of the box and the helical ridges on the same.

My invention relates to certain improvements in axle-boxes.

This box consists of a shell with helical ridges and grooves on the interior, extending part way around; and with helical ridges on its exterior, extending part way around, with collars, on the interior of each of which is a circular groove, and its exterior formed with an octagonal nut. The helical grooves and ridges on the interior, together with the groove on the inside of each collar, serve to hold in place any anti-friction substance that might be placed therein. The helical grooves on the exterior are for the purpose of putting the box in a wooden hub and holding it there firmly.

Referring to the drawings, A, is the collar.

B, is the shell of the box, C, is the helical groove in the box, and D, is the helical ridge in the box.

E, is the helical ridge on the exterior of the box, and F, is the groove in the collar.

G, is the octagonal nut on the exterior of the collar.

This axle-box substantially as shown and described can be used on and made to fit any vehicle axle.

Having thus described my invention, what I claim as new and useful and desire to secure by Letters Patent, is as follows:—

1. An axle box embodying a shell, and collars fitted in each end of the shell, there being means formed in the shell and collars for holding an anti-friction substance within the axle box.

2. An axle box embodying a shell having helical grooves and ridges on the interior thereof, collars mounted in the ends of the shell and each having its inner end formed with an annular groove and its outer end formed with a nut, substantially as specified.

CHESTER A. LATHAM.

Witnesses:
 A. J. ADAMS,
 MINNIE H. DAVIS.